Patented Nov. 22, 1938

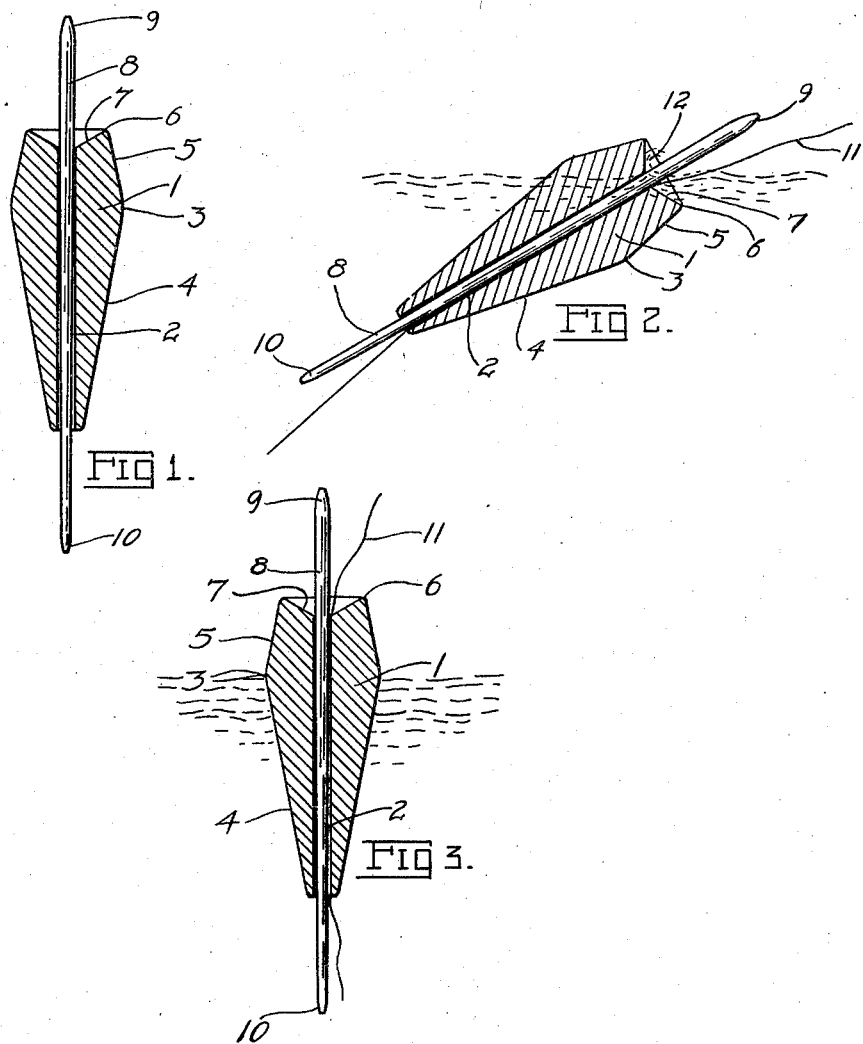

2,137,341

UNITED STATES PATENT OFFICE 2,137,341

FISHING FLOAT

James A. Hingle, Houston, Tex., assignor, by mesne assignments, of two-thirds to J. R. Phillips, and one-third to James P. Westmorland, both of Houston, Tex.

Application December 13, 1935, Serial No. 54,212

3 Claims. (Cl. 43—49)

This invention relates to fishing floats, and particularly to that type of float adapted to be used in fishing with a hook and line in the well known manner.

Ordinarily floats such as referred to have been made of round, conical, double conical or other outer regular formation, and have been designed to serve no other purpose than that of a float to hold the line, and to dip when a bite is obtained.

It is an object of this invention to provide such a float which will serve the additional function of enabling the fisherman to attract fish to the vicinity of his line by causing a sound similar to that produced by fish feeding upon food which is floating in the water.

With the above and other objects in view, one embodiment of this invention is set forth in the following description and the accompanying drawing. It will be understood, however, that the same is by way of illustration and example only and is not to be taken by way of limitation. This invention is to be limited in its scope only by the prior art and by the terms of the appended claims.

Referring now more particularly to the drawing in which like numerals indicate corresponding parts throughout:

Fig. 1 is a vertical sectional view through the embodiment of this invention which has been selected for purposes of illustration.

Fig. 2 is a similar sectional view showing the action of the invention when manipulated by the fisherman to produce the desired sounds, and Fig. 3 is a similar view showing the invention floating in the water when not so manipulated.

The numeral 1 indicates the body of the float which may be formed from any suitable light weight material such as for example cork, balsa wood, or the like. If a porous material is employed, it must of course be waterproofed by coating with varnish or the like.

The body 1 is formed with an opening 2 axially therethrough of substantially uniform diameter, and its outer surface is tapered from its largest diameter at 3 in a downward direction as at 4 and in an upward direction as at 5. The lower part is tapered to a point where it is only slightly larger than the opening 2, whereas the upper part terminates at 6 where it is of relatively large diameter. In horizontal cross section the body 1 is preferably circular throughout, thus making the two ends frusto-conical, but other suitable shapes may be employed if desired. The upper end of the body 1 is hollowed out as at 7 to produce a conical cup shaped recess therein.

A tapered pin 8 having relatively sharpened or reduced upper and lower ends 9 and 10, is forced into the opening 2 in the body after the line 11 has been passed therethroough, for the purpose of securing the line in place. The purpose of tapering this pin is to permit it to be firmly seated in the opening 2, yet capable of being easily removed when desired.

The operation of this invention is as follows:

It is well known that fish, particularly when feeding on matter floating on the surface of the water produce a sound which may be described as a sort of popping noise. It has been observed that when one or more fish are so feeding and producing this sound others will be attracted to the vicinity thereby.

When the float of this invention is floating in the water as shown in Fig. 3, its action is much the same as any other float, including all of the advantages thereof. However, when the line 11 is pulled suddenly by the fisherman, the float will tilt as in Fig. 2, and will dip on one side until the water flows suddenly into the recess 7 and slaps against the opposite side thereof, which is then almost vertical, as shown at 12. The amount of water so acting is small, but the surface 7 is so shaped that this action produces a popping sound similar to that produced by fish in feeding, and it has been found to attract fish to its vicinity in much the same manner.

From the foregoing it will be seen that means has been provided for carrying out the objects of this invention in a simple and practical manner. It will be appreciated that the invention may take various forms such as may fall within the scope of the appended claims, and that the invention is not limited to the specific embodiment set forth.

Having described my invention, I claim:

1. A fishing float comprising a body adapted to float in a vertical position, and having its upper end hollowed out to form a concavity, the upper edges of said concavity being continuous and lying in a plane substantially perpendicular to the axis of said body whereby when said body is tilted in any direction from its vertical position water will be caused to enter said concavity and cause a popping sound.

2. A fishing float comprising a body having a conically shaped lower portion and a frusto conically shaped upper portion of less extent than said lower portion, said body having a conical cavity in its upper end, the outer edges thereof lying in a plane substantially perpendicular to the axis of said body and said concavity being substantially concentric with said body, said body having an opening axially therethrough to receive a fishing line, and a tapered pin adapted to extend downwardly through said axial opening to bind said fishing line in position whereby said fishing line will be secured to said float so as to extend upwardly from a point substantially in the center of said conical cavity.

3. A fishing float comprising a body adapted to float in a vertical position and having its upper end hollowed out to form a cavity, the outer edges thereof lying in a plane substantially perpendicular to the axis, and said cavity being substantially concentric with said body, said body having an opening axially therethrough to receive a fishing line, and a pin adapted to extend downwardly through said axial opening and form a taper fit therewith to bind said fishing line in position, whereby said fishing line will be secured to said float so as to extend upwardly from a point substantially in the center of said cavity.

JAMES A. HINGLE.